Patented Dec. 23, 1924.

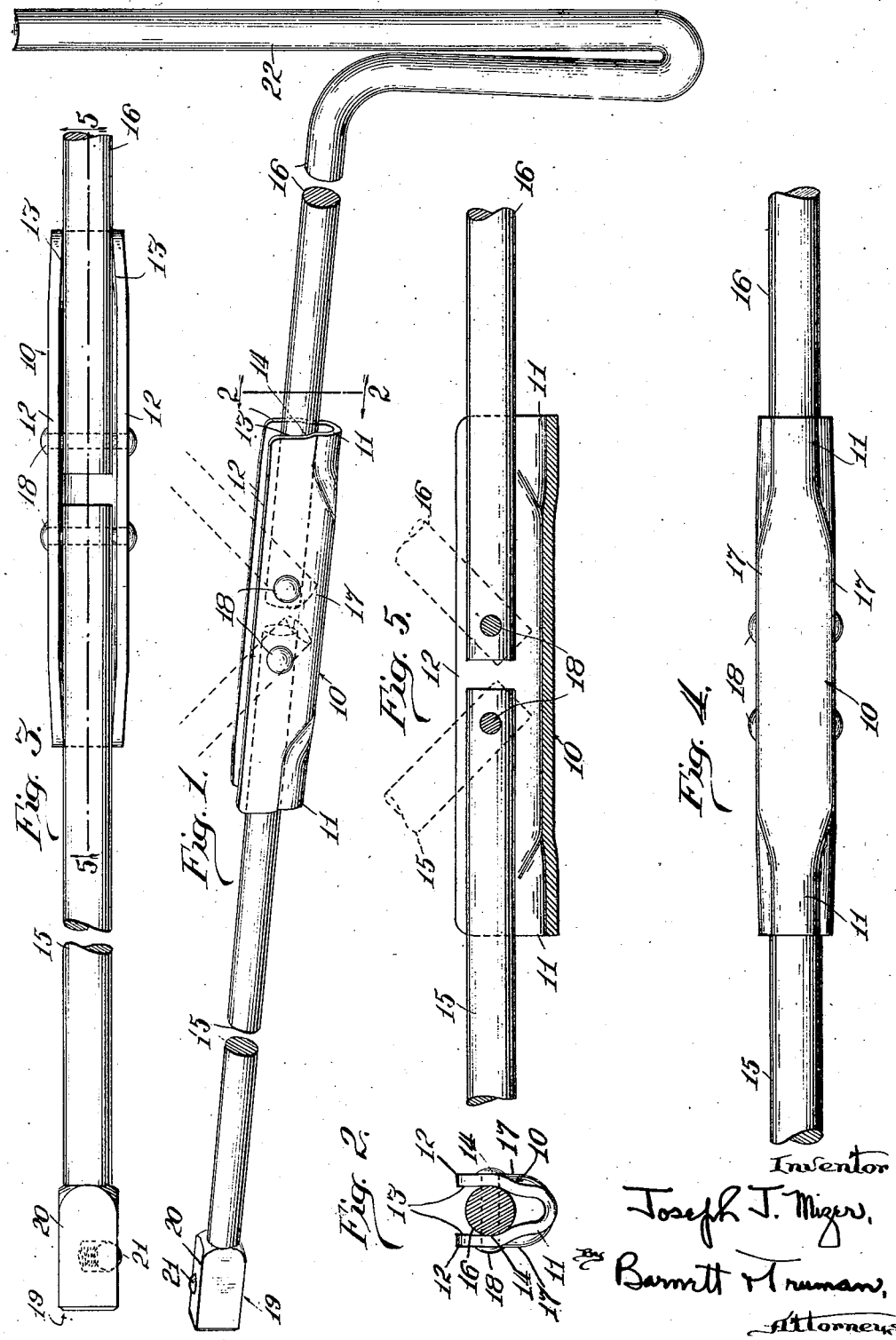

1,520,134

UNITED STATES PATENT OFFICE.

JOSEPH J. MIZER, OF RACINE, WISCONSIN, ASSIGNOR TO WALKER MANUFACTURING COMPANY, OF RACINE, WISCONSIN, A CORPORATION OF WISCONSIN.

AUTOMOBILE HAND-JACK HANDLE.

Application filed April 14, 1923. Serial No. 632,008.

*To all whom it may concern:*

Be it known that I, JOSEPH J. MIZER, a citizen of the United States, residing at Racine, in the county of Racine and State of Wisconsin, have invented certain new and useful Improvements in Automobile Hand-Jack Handles, of which the following is a specification.

My invention relates to separable handles for automobile jacks, which may be detached from the jack, folded and stored in small space.

It is an object of my invention to provide a detachable hinged folding handle for an automobile jack having a distinctive resilient member to exert a spring and gripping action upon the other parts of the handle to hold said hinge from folding when the device is in use.

Another object of my invention is to provide a detachable folding handle for an automobile jack of a collapsible and readily detachable form wherein the various parts will not quickly wear out or become loosened, and which combines efficiency with strength, durability, lightness, and low manufacturing cost.

Other objects and advantages of the invention will be apparent during the course of the following description.

In the accompanying drawings forming a part of this specification and in which like numerals are employed to designate like parts throughout the same, Fig. 1 is a longitudinal side view in perspective of a handle for an automobile jack embodying my invention, in an extended or operable position, the dotted lines showing how the parts may be folded.

Fig. 2 is an enlarged sectional view taken along the line 2—2 of Fig. 1, showing an end view of the resilient sleeve member.

Fig. 3 is a top plan view of an embodiment of my invention showing the open side of the resilient member, and the upset rectangular end of one of the longitudinal members for introduction into a suitable socket in the jack.

Fig. 4 is a bottom plan view showing reduced and retracted portions in the resilient sleeve member.

Fig. 5 is a central longitudinal sectional view taken along the line 5—5 of Fig. 3, showing means for securing the longitudinal members to the resilient sleeve member, and an interior view of the reduced and retracted portions of the resilient sleeve member.

In the drawings, wherein for the purpose of illustration is shown a preferred embodiment of my invention, the numeral 10 designates a resilient member in the form of a channel or split sleeve. The central portion of this member 10 has a flat base and substantially parallel side portions 12. These side portions 12 converge slightly toward one another near their ends as at 13. These converging ends 13 are further retracted or curved toward one another where they join at the end of the base as at 11, to provide additional gripping elements for the members 15 and 16 as hereinafter described.

Pivotally secured between the central side portions 12 of the member 10 by any suitable means, such as rivets 18, are the longitudinal sections 15 and 16 of the handle. When these members are moved from the folded position shown in dotted lines, to the extended or operating position shown in full lines, they will first be frictionally gripped by the converging ends 13 of the clip, a final gripping action being presented by the retracted end portions 11 as the members 15 and 16 reach fully extended position. The spring gripping action thus increases progressively as the members are moved to operative position, and looseness or play in the parts is prevented. The exterior end 19 of the longitudinal member 15 is upset for a substantial distance so as to form a rectangular portion 20 suitable for insertion in a corresponding socket in the jack. For a substantial distance along its exterior or free end the longitudinal member 16 is bent to form an approximately T-shaped handle portion 22.

Assuming the rectangular end portion 20 to be inserted in the socket of a jack, the two longitudinal members having first been swung away from each other, or divergently until in line with each other, in which position the reduced and retracted portions of the resilient member or sleeve are in frictional contact with them, upon grasping and rotating the handle portion 22, the jack screw is actuated and the jack raised or lowered.

The handle may be readily removed from the jack socket and completely folded or closed by bringing the two longitudinal members in complete contact with each other. The handle may then be readily stowed away.

My invention eliminates the trouble and inconvenience caused by loose and easily worn joints of the common type in automobile jack handles of a rotatable and folding character.

The device may be rapidly and cheaply manufactured out of any suitable material, such as ordinary commercial steel, giving desired strength and service with a minimum amount of material.

So far as I am aware I am the first in the art to provide a collapsible handle comprising a bar and a member having side portions in converging spaced relation pivotally connected with the bar in position to be swung to bring the side portions into resilient gripping engagement with opposite faces of the bar, whereby as the bar and the side portions of the member are worn in use effective gripping may be effected by a very slightly increased pivotal movement for jamming the bar to an increased extent into the grip of the convergent side portions.

I claim:

1. A folding handle comprising a bar formed in two sections, a clip in the form of a channel member having a base, and central substantially parallel side portions between which the adjacent ends of the bar sections are pivoted, the ends of the side portions of the clip converging toward one another into gripping relation with the bar section therebetween, the space between the gripping end portions decreasing away from the open side of the channel, so as to provide a progressive gripping action on the bar section as it is forced into the channel.

2. A folding handle comprising a bar formed in two sections, and a clip in the form of a channel member having a base, and central substantially parallel side portions between which the adjacent ends of the bar sections are pivoted, the ends of the side portions of the clip converging toward one another as they approach the ends of the clip into gripping relation with the bar section therebetween, and the merging portions of the ends of the base and side portions being retracted to decrease the space therebetween and provide an additional gripping means for the bar sections.

JOSEPH J. MIZER.